United States Patent
Hall et al.

(10) Patent No.: US 9,967,957 B2
(45) Date of Patent: May 8, 2018

(54) WIRELESS RAIL WITH DYNAMIC LIGHTING

(71) Applicants: David R. Hall, Provo, UT (US);
Jerome Miles, Spanish Fork, UT (US);
Joseph Duncan, Provo, UT (US)

(72) Inventors: David R. Hall, Provo, UT (US);
Jerome Miles, Spanish Fork, UT (US);
Joseph Duncan, Provo, UT (US)

( * ) Notice: Subject to any disclaimer, the term of this patent is extended or adjusted under 35 U.S.C. 154(b) by 190 days.

(21) Appl. No.: 15/143,989

(22) Filed: May 2, 2016

(65) Prior Publication Data
US 2017/0318649 A1    Nov. 2, 2017

(51) Int. Cl.
| | |
|---|---|
| F21V 21/00 | (2006.01) |
| H05B 37/02 | (2006.01) |
| F21V 23/02 | (2006.01) |
| F21S 8/00 | (2006.01) |
| F21S 8/04 | (2006.01) |

(52) U.S. Cl.
CPC .......... H05B 37/0272 (2013.01); F21S 8/038 (2013.01); F21S 8/043 (2013.01); F21V 23/02 (2013.01); H05B 37/0218 (2013.01); H05B 37/0227 (2013.01)

(58) Field of Classification Search
CPC .... F21S 8/038; F21S 8/043; F21S 8/04; F21S 8/046; F21V 23/02; H05B 37/0218; H05B 37/0245; H05B 37/0281; H05B 37/029; H05B 37/0227; H05B 37/0272
See application file for complete search history.

(56) References Cited

U.S. PATENT DOCUMENTS

| | | | | |
|---|---|---|---|---|
| 6,211,626 | B1* | 4/2001 | Lys | A61N 5/0616 315/291 |
| 6,459,919 | B1* | 10/2002 | Lys | A61N 5/0616 315/291 |
| 7,471,051 | B1* | 12/2008 | Wacknov | H05B 37/0254 315/291 |
| 2004/0155609 | A1* | 8/2004 | Lys | H05B 33/0803 315/292 |
| 2013/0320864 | A1* | 12/2013 | Yoo | H05B 37/02 315/154 |
| 2014/0217906 | A1* | 8/2014 | Vo | H05B 37/0272 315/155 |
| 2015/0127260 | A1* | 5/2015 | Mulller | G01K 13/00 702/1 |
| 2015/0338077 | A1* | 11/2015 | Johnson | F21V 23/005 362/234 |

* cited by examiner

*Primary Examiner* — Ali Alavi

(57) ABSTRACT

A lighting system is disclosed which provides dynamic lighting control of each light on a rail lighting system. The lighting system is able to change settings of each light within a track lighting or rail lighting system based on motion, user preferences, lighting conditions, or security parameters. Light intensity and color can be set and scheduled based on user control and programming. Optical sensors may also be used to provide control input for the track lighting or rail lighting.

20 Claims, 20 Drawing Sheets

WIRELESS RAIL WITH DYNAMIC LIGHTING

FIELD OF THE INVENTION

This invention relates to wireless tracks or rails used to power and control auxiliary devices connected to the track or rail.

BACKGROUND OF THE INVENTION

Track lighting systems are well-known for use in interior decorating, display cases, and many other uses. Typical track lighting systems use a track having an interior channel with electrical conductors within the interior channel. Light fixtures usually include two tangs that are inserted into the track interior channel and twisted until contact is made with the electrical conductors. The tracks are normally mounted to a wall or ceiling by mounting screws.

Presently, in an installation with track lighting like in a restaurant, art gallery, or restaurant, etc., a single wall dimmer or dimmer pack is connected to one or more circuits in a lighting track. This method of connection allows all line voltage lights connected to the lighting track to be dimmed by the same amount if the same wattage lamps are used in the lights. This setup is appropriate in a situation where equal light levels are desired. However, when different levels of light are desired, the end-user must use different wattage lamps and be limited by the set lamp wattages available for a particular lamp holder, or must run multiple lighting tracks in the same space and dim accordingly. This arrangement sets limitations on the end-user and limits their creative flexibility in lighting design.

At times there arises a need for individual dimming control of separate and discrete line voltage lights, without having to run more cables and power lines or lighting tracks to each light.

Existing track lighting systems only supply power to devices but do not allow for dynamic wireless control of lighting or other devices mounted to the track.

SUMMARY

The invention has been developed in response to the present state of the art and, in particular, in response to the problems and needs in the art that have not yet been fully solved by currently available apparatus and methods. Accordingly, apparatus and methods in accordance with the invention have been developed to provide wireless control of devices and lighting along a track or rail. The features and advantages of the invention will become more fully apparent from the following description and appended claims, or may be learned by practice of the invention as set forth hereinafter.

A wireless rail system for providing power and control to auxiliary devices on the rail is disclosed. Such a system includes a one or more channels mounted to a structural building component forming a rail. Auxiliary devices on the rail communicate with each other and user devices. Each of the auxiliary devices are addressable either wirelessly or by a parallel bus within the rail. The auxiliary devices are connected and disconnected from the rail by rotating approximately 90 degrees.

A lighting system is disclosed which is able to provide dynamic lighting control of each light on a rail lighting system. The lighting system is able to change settings of each light within a track lighting or rail lighting system based on motion, user preferences, lighting conditions, or security parameters. Light intensity and color can be set and scheduled based on user control and programming. Optical sensors may also be used to provide control input for the track lighting or rail lighting.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, may be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings.

Figure 1:
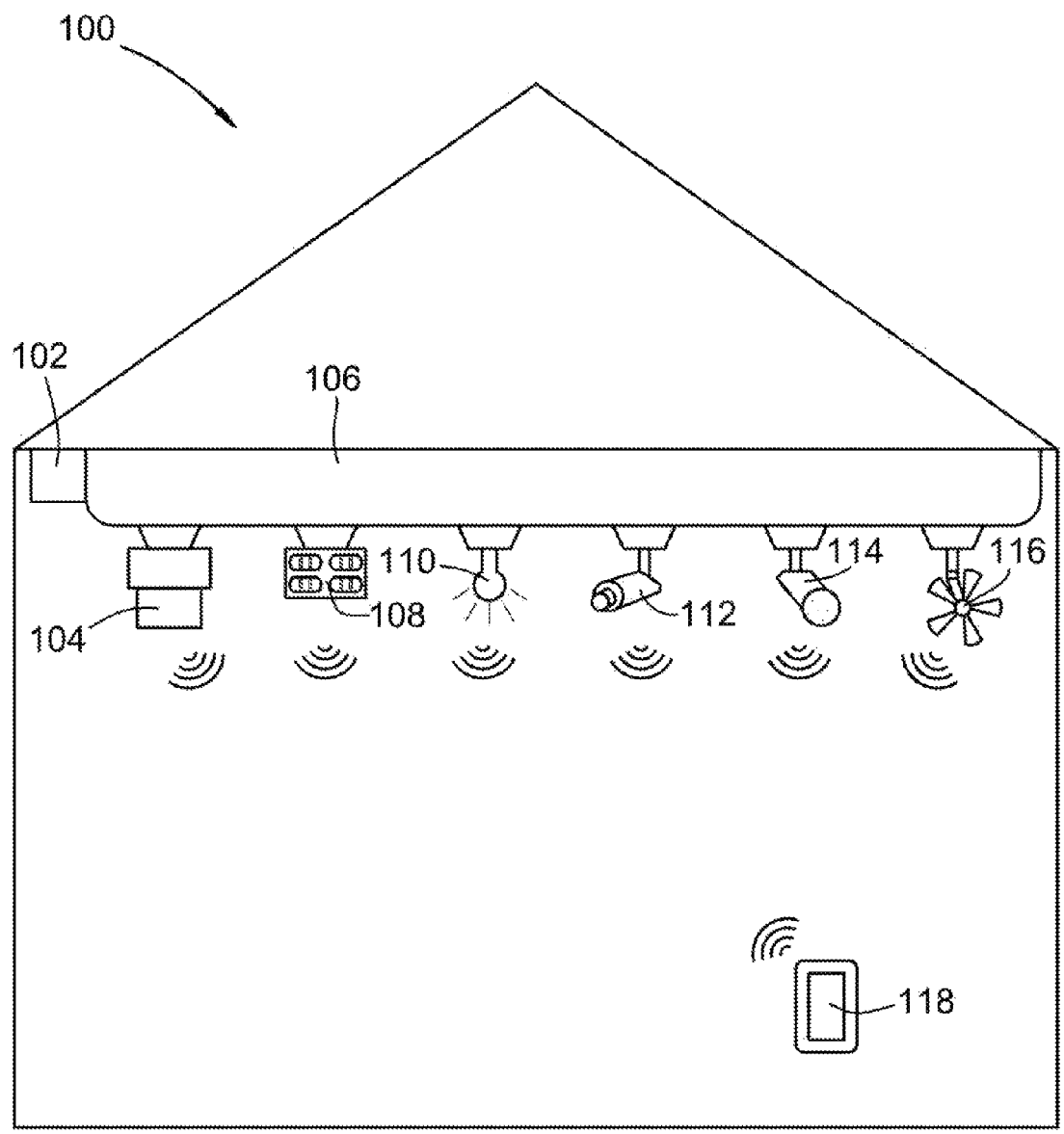
FIG. 1 is a front view of a wireless track or rail with attached auxiliary devices in accordance with the invention.

Referring to FIG. 1, a structure 100 with a wireless track or rail 106 is shown attached to a ceiling of the structure. The structure 100 may be a home, garage, workshop, shed, office building, pavilion, tent, etc. The wireless rail 106 has a first power supply 102 which feeds parallel power to the rail 106 by way of bus lines. The first power supply 102 may supply high voltage such as 120 volts or 240 volts and may additionally or alternatively supply low voltage power such as 5 volts, 12 volts, 24 volts, and/or 48 volts to the parallel bus lines of rail 106. The first power supply 102 may also supply alternating current (AC) and/or direct current (DC) to the parallel bus lines of rail 106. Auxiliary devices 104, 108, 110, 112, 114, and 116 are shown connected to rail 106. Each of the auxiliary devices may include a second power supply which is removable attached to the rail along with the auxiliary device itself. Each auxiliary device may also include a wireless communication module for both wireless communicating with other auxiliary devices and with user device 118. Each communication module may use a single or multiple communication technologies in combination. For instance, controller 104 may use a WiFi or SureFi signal to communicate with a user device or network and also use Bluetooth to simultaneously communicate with other auxiliary device connected to the rail. Controller may also use bus lines as an antenna to wirelessly communicate with user device 118 or another wireless device not on the rail and/or other auxiliary devices on the rail which may or may not share a direct electrical connection to a common antenna bus line. Auxiliary devices on the rail may be used to auto-tune a common bus antenna on the rail by providing dynamic reactance to the common bus antenna on the rail. A common bus antenna may be a ground line, power line, or data line of the rail bus. Digital and analog control signals may also be transmitted along a ground line, power line, or data line of the rail bus. Auxiliary devices along the rail may communicate by bus line or by wireless transmission or by a combination of both. User device 118 may be a laptop, cellular telephone, ipad, ipod, or any other device capable of wireless communication. Auxiliary devices may include controllers, computers, monitors, lighting, power receptacles for all types of power and voltage levels, cameras, microphones, speakers, fans, heaters, air conditioners, appliances, transceivers, wireless memory storage, lifters, air compressors, smoke detectors, carbon monoxide detectors, alarms, security systems, home automation controllers, and/or motion sensors.

Figure 2:
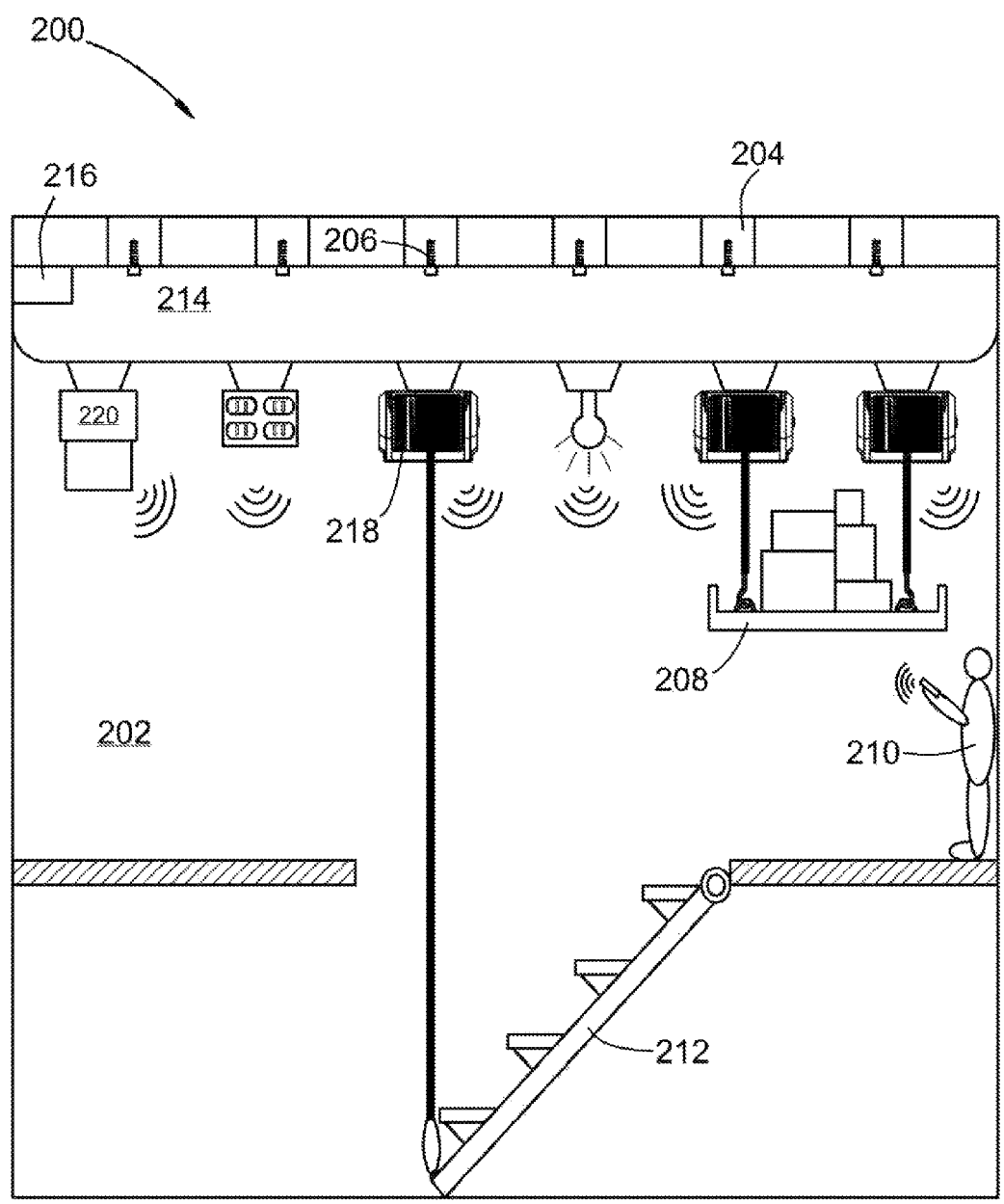
FIG. 2 is a front view of a wireless track or rail with attached auxiliary devices in accordance with the invention.

FIG. 2 shows an assembly 200 comprising an example of a wireless rail 214 installed in an attic area 202. Wireless rail 214 is bolted to joists 204 using fasteners 206. The wireless rail is bolted to joists for increased load capacity. In FIG. 2, a user 210 used his cellular telephone to lower wench 218 allowing stairs 212 to become accessible. His cellular phone may have used Wifi or Bluetooth to communicate with controller 220 or directly with wench 218. Next user 210 desires to lower platform 208 and access items on the platform. The user then uses his cellular phone to lower two wenches simultaneously to lower platform 208. The user also uses his cellular phone to control the attic light which is located on wireless rail 214. Controller 220 may include a wireless memory storage and allow computers and other auxiliary devices along with the auxiliary devices on the wireless rail to use the memory.

For example, user 210 may store 10,000 home videos on the wireless memory storage located on the wireless rail in the attic space and my retrieve the videos on demand from within the user's home or office. The rail provides a convenient source of power and accessibility for all devices on the wireless rail.

Figure 3:
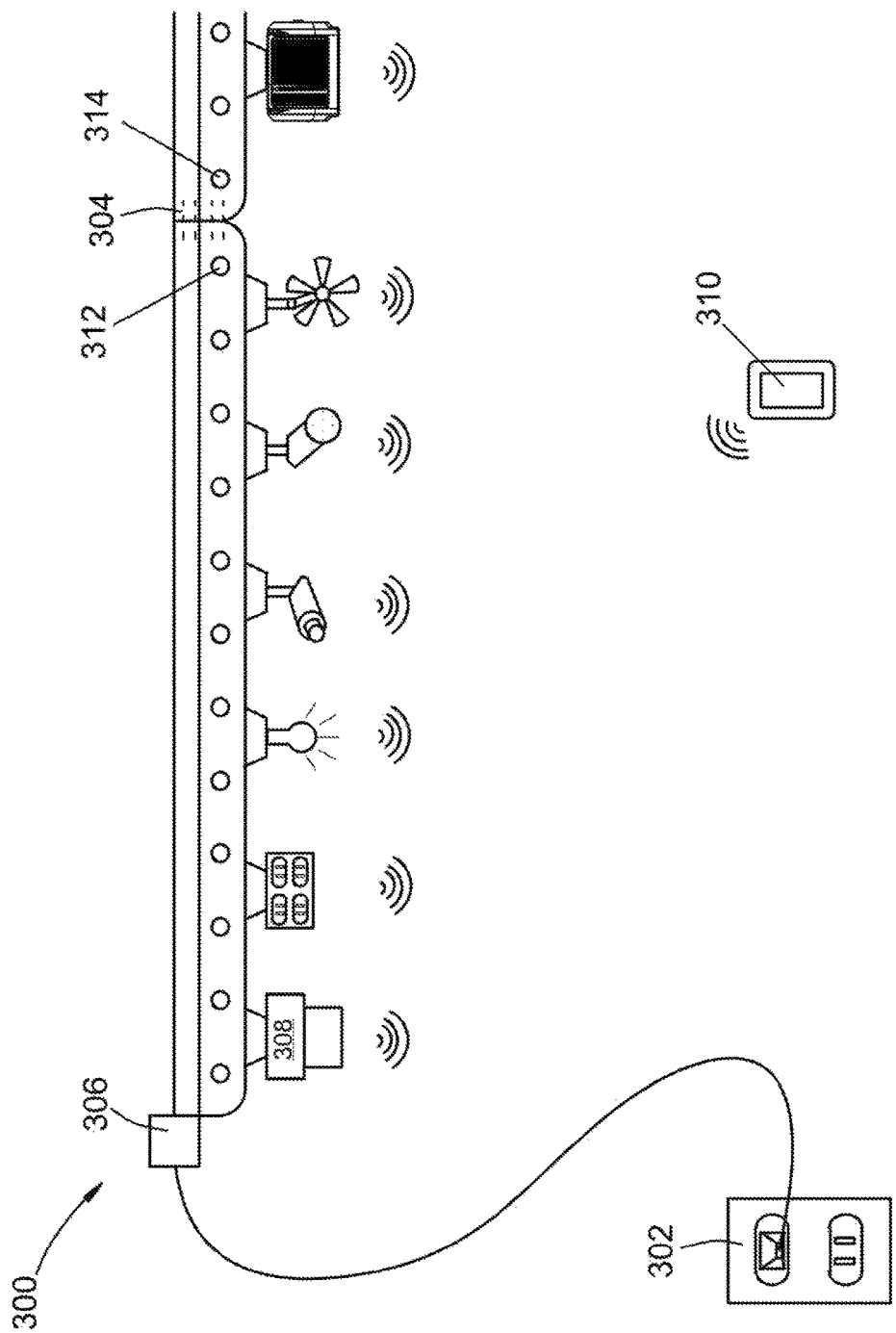
FIG. 3 is a front view of a wireless track or rail with attached auxiliary devices in accordance with the invention.

FIG. 3, shows an assembly 300 comprising two wireless rail segments 312 and 314 joined at 304. These rail segments may have reinforced side edges to accommodate weight and positioning needs. This rail is a powered by a wall outlet 302 and may have an additional transformer in area 306 for supplying low voltages in addition to a high voltage of the wall outlet. Controller 308 may include the ability to address each of the auxiliary components on the rail and allow access to device 310 of all auxiliary devices.

Figure 4:
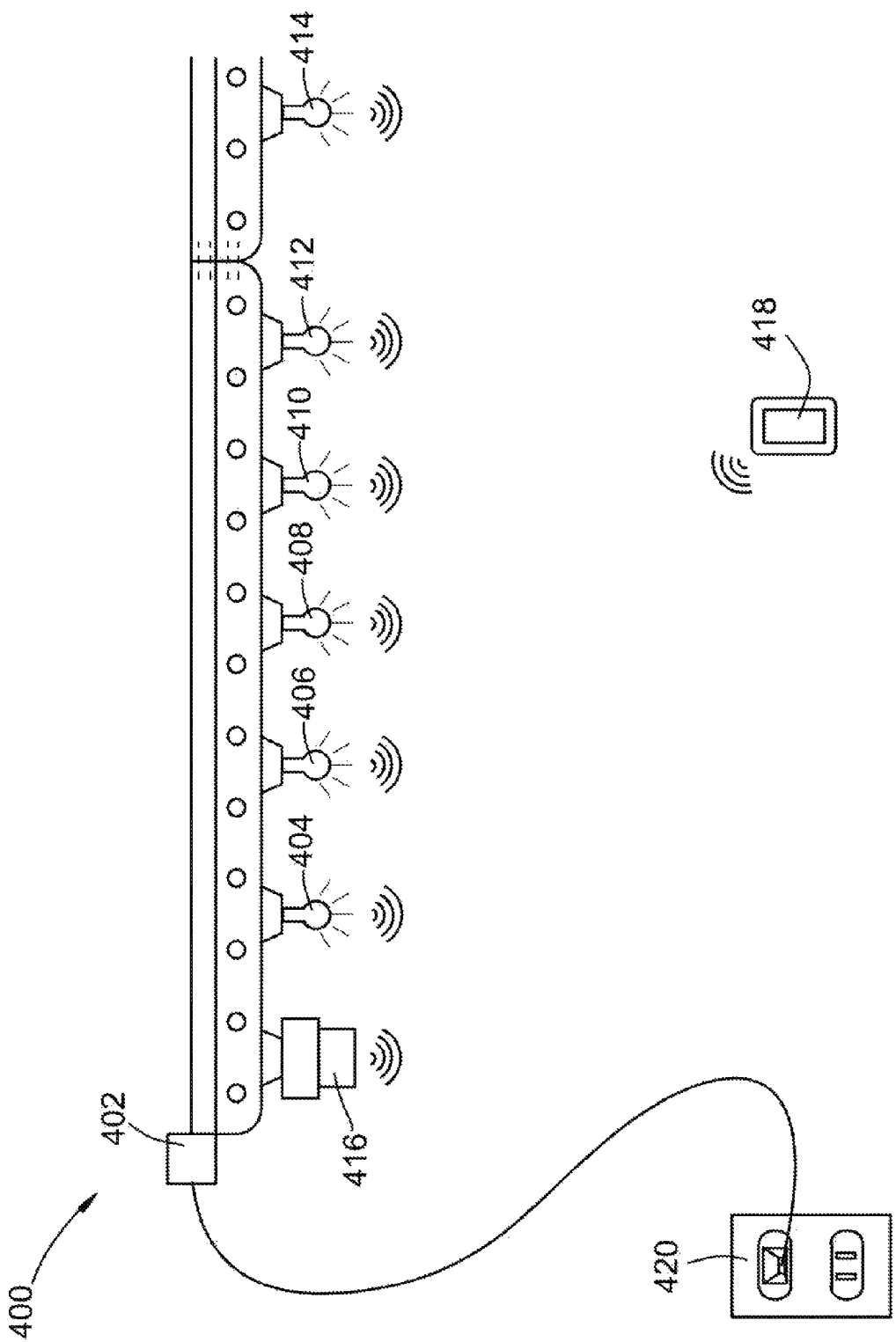
FIG. 4 is a front view of a wireless track or rail with attached auxiliary devices in accordance with the invention.

FIG. 4, shows a wireless rail assembly 400 comprising a transformer 402 and a controller 416 and lights 404, 406, 408, 410, and 412. The lights may be any combination of LEDs, florescent, incandescent, halogen, neon, or mercury vapor lights. The lights may each have controllers built in to each of the light bases which allow for control of the color, intensity or radiation pattern of the light transmitted. Each of the lights may include a wireless transceiver for communicating with each other and with controller 416 and with user device 418. Each light may use communicate a first wireless signal and second wireless signal. The first wireless signal may be a long range or a short range signal. The second wireless signal may be a long range or short range signal. One or more control signals may be transmitted by way of bus lines of the wireless rail. Each light on the rail may send or receive one or more wireless signals using one or more antennas which may be common data bus lines, power lines or ground lines on the rail bus. Controller 416 may include a motion sensor, optical sensor, camera, or microphone for enabling dynamic control of the lights on the rail. For example, a person may walk across a room and lights may turn on or increase in brightness based on a direction of motion of the person. A camera or optical sensor may detect a change of lighting in a room due to cloud cover and automatically increase specific lights based on a predetermined lighting threshold in a specific area of a room. Each light may be removable by turning the light 90 degrees. Each light may be individual configured by a user or home owner according to user preferences. A user lighting schedule may be set for each individual light or for a group of lights. Each light may communicate directly with a user or with controller 416 wirelessly. Each light may additionally or alternatively be addressed by controller 416 allowing access to each light from a user device or a remote location over the internet.

Figure 5:
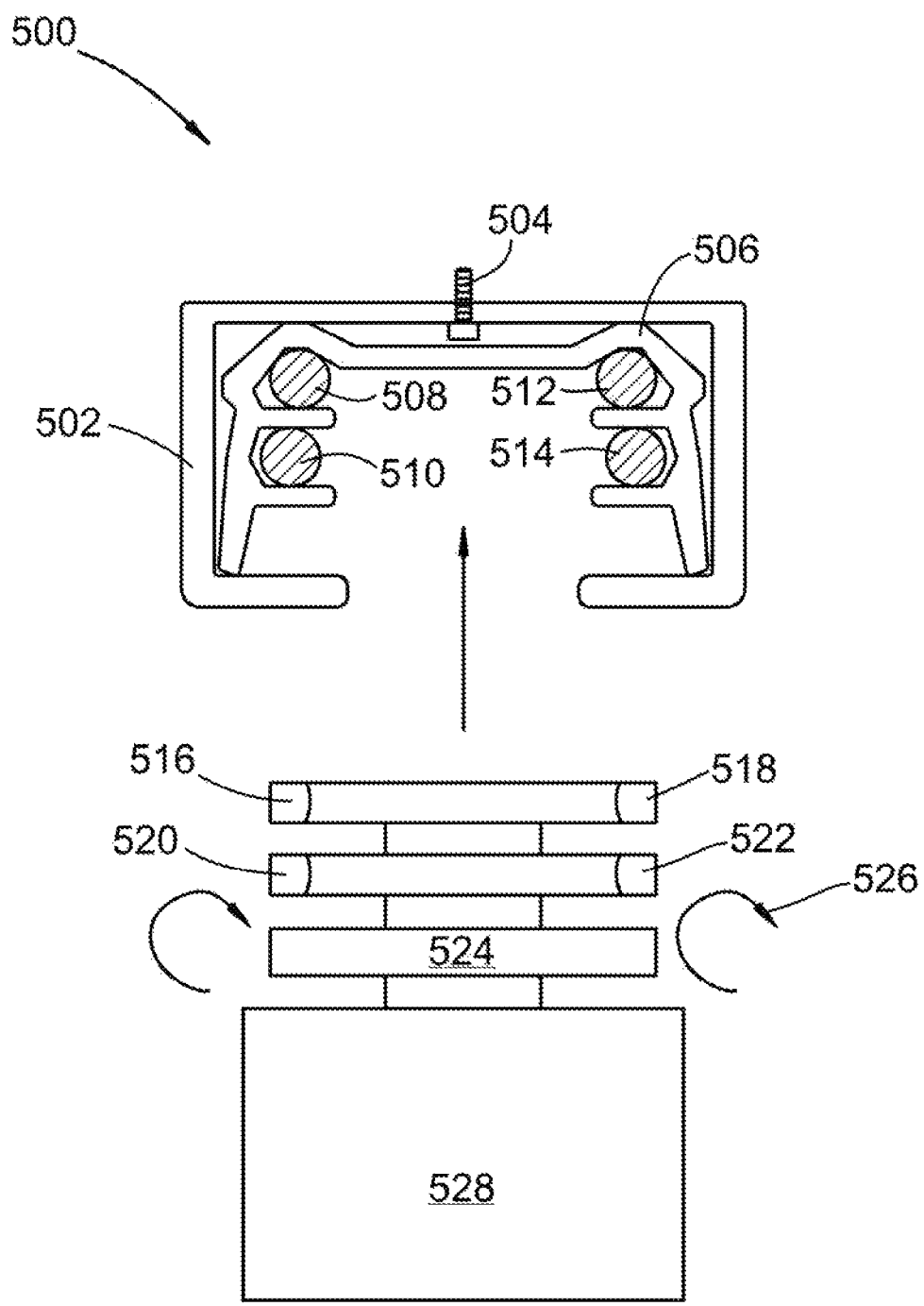
FIG. 5 is a side view of a wireless track or rail with a detached auxiliary device in accordance with the invention.

FIG. 5, shows an assembly 500 comprising a wireless rail 502 with an inner bracket 506 and wireless rail bus lines 508, 510, 512, and 514. Auxiliary device 528 is connected to rail 502 by inserting the auxiliary device into the rail track and turning the auxiliary device 90 degrees. When auxiliary device 528 is inserted into the rail, bus lines 508, 510, 512, and 514 are connected to 516, 518, 520, and 522 of auxiliary device 528. Wireless rail 502 may be mounted to a wall, stud, joist, or other structural member by way of fastener 504. Fastener 504 would be installed with inner bracket 506 removed.

Figure 6:
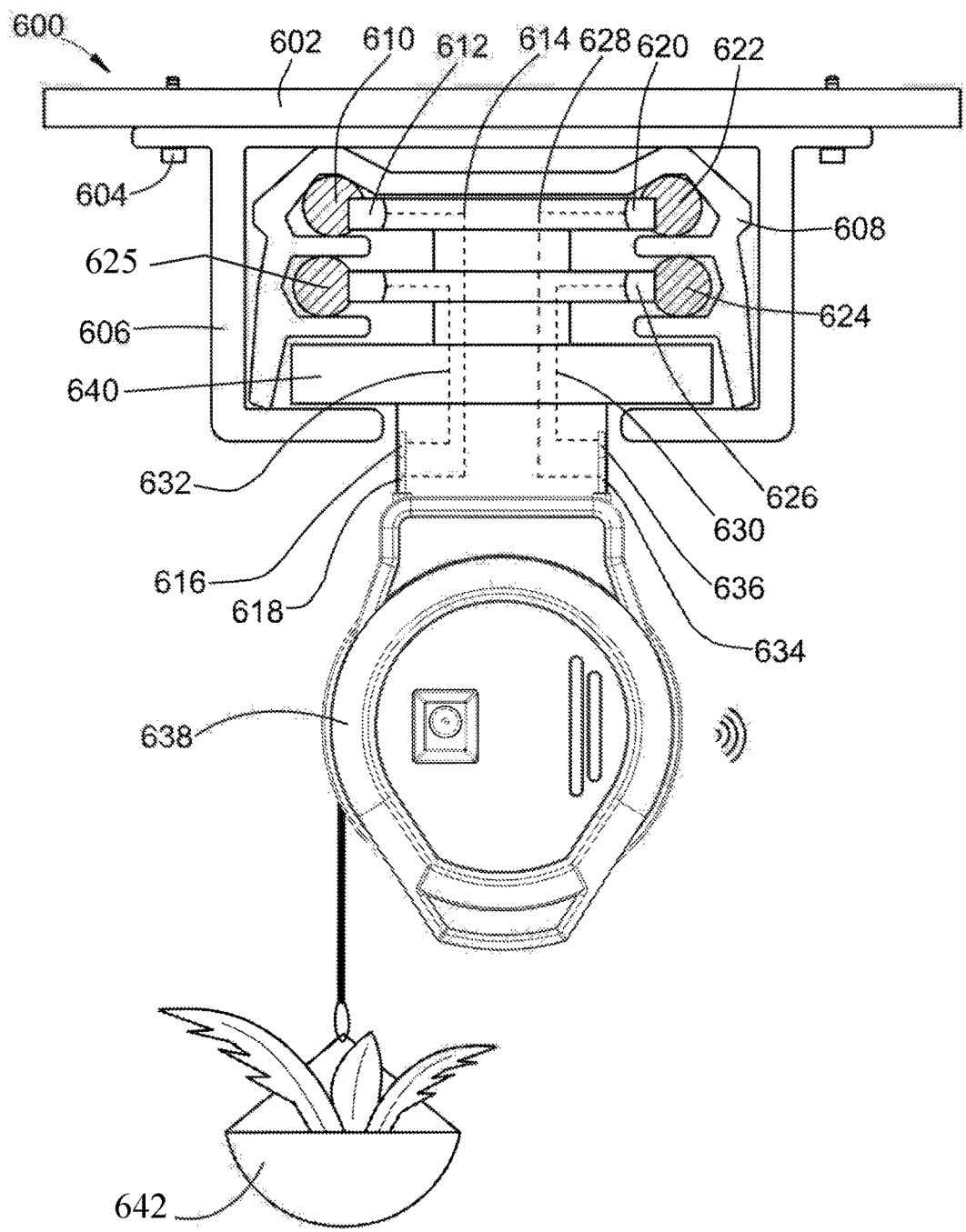
FIG. 6 is a side view of a wireless track or rail with an attached auxiliary device in accordance with the invention.

FIG. 6 shows an assembly 600 comprising a plant 642 being lifted by lifter 638 which is installed in wireless rail 606. Wireless rail 606 is attached to ceiling 600 by fasteners 604. The plant may be lowered by a user to water the plant.

Also shown in FIG. 6 are wire connections 614, 628, 632, and 630 between lifting device 638 and the bus lines 624, 624, and 610. Here we have a power line 619, a ground line 610, a data line 624 and a common antenna 625. The common antenna line is used to communicated with other wireless auxiliary devices on the wireless rail and/or a user device. A user device may include a Wifi router, cellular telephone, user computer, or other cloud based user access point. Wireless rail 606 may be formed of steel, plastic, carbon fiber, or other suitable material for holding auxiliary devices. Heavy auxiliary devices such as lifer 638 may include a weight bearing member 640 for directly distributing weight of the auxiliary device onto a portion of the wireless rail 606.

Figure 7:
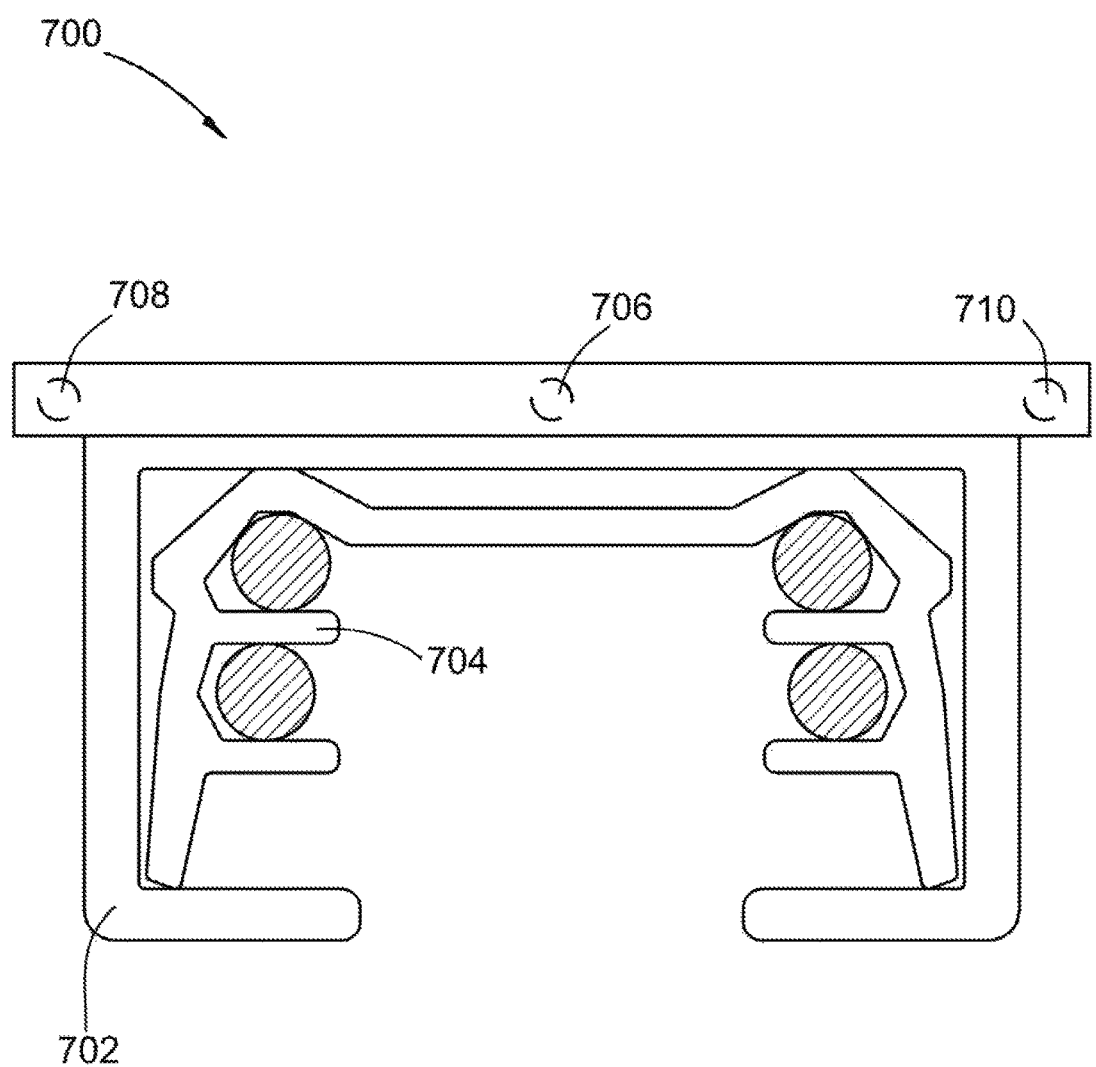
FIG. 7 is a cross-sectional view of a wireless track or rail in accordance with the invention.

FIG. 7 shows an assembly 700 comprising a wireless rail 702 with mounting options 708,706, and 710. Mounting hole 706 is used to mount wireless rail 702 when the inner bracket holding the bus lines has been removed. The inner bracket may have protrusions 704 which separated the bus lines.

Figure 8:
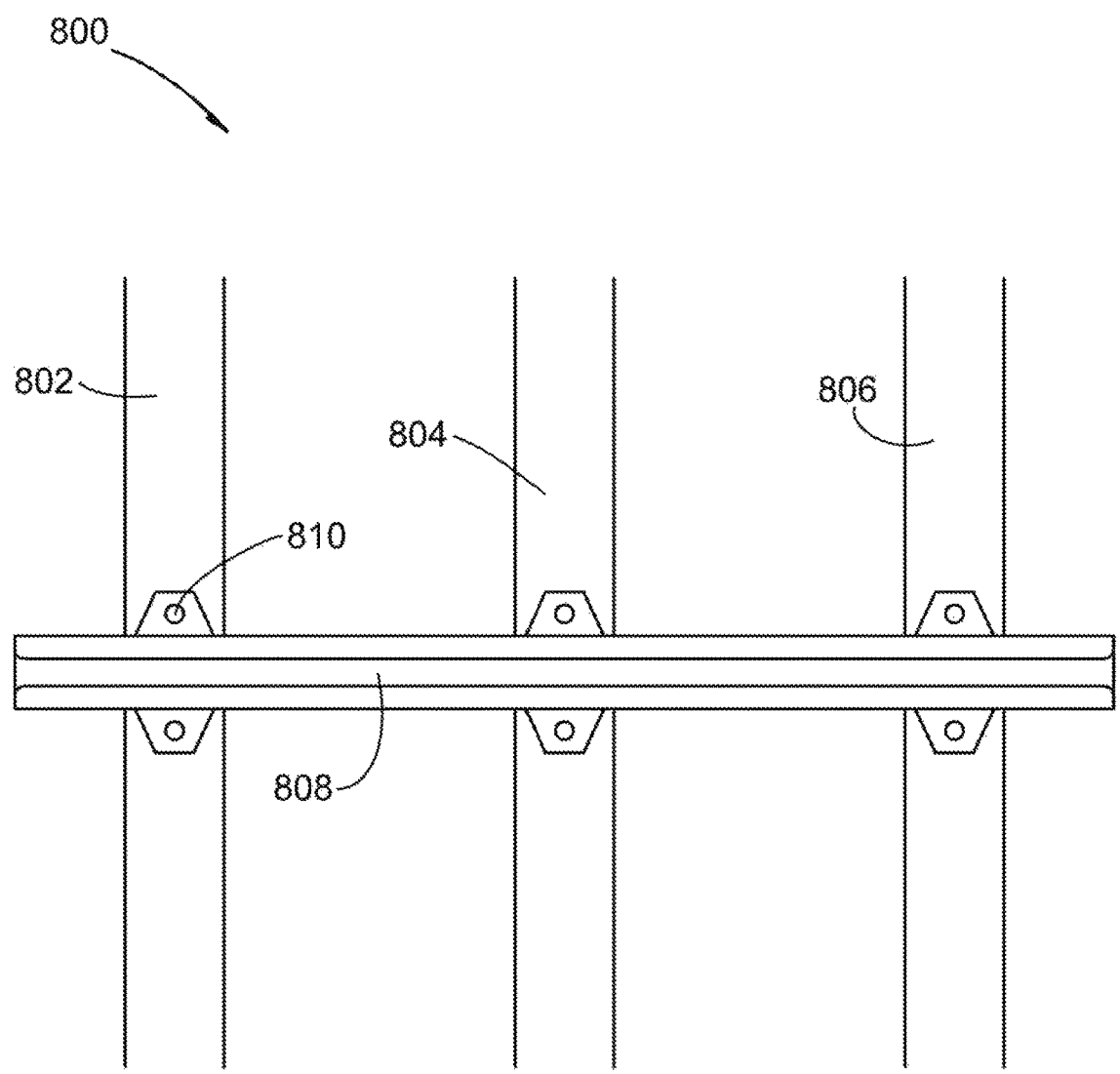
FIG. 8 is a bottom view of a wireless track or rail in accordance with the invention.

FIG. 8 shows an assembly 800 comprising a mounting option of wireless rail 808. Wireless rail 808 is mounted to studs 802 along a wall. Holes 810 are used to secure wireless rail 808 to studs 802, 804, and 806.

Figure 9A:
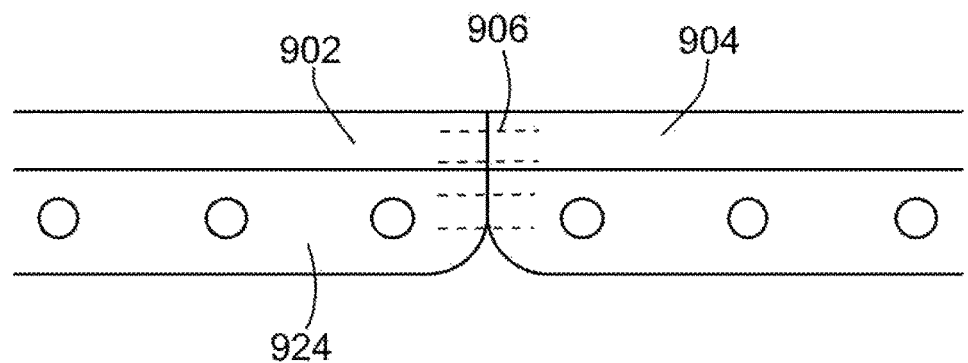
FIGS. 9a and 9b are side views of wireless tracks or rails with an attached and detached rail in accordance with the invention.
Figure 9B:
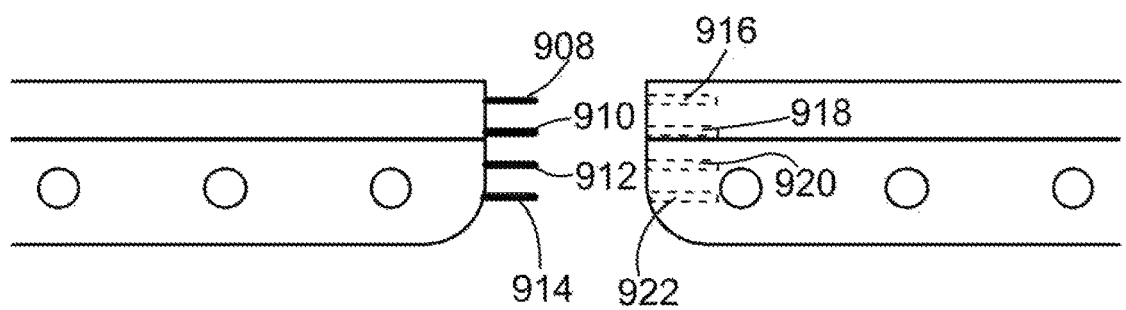

FIGS. 9a and 9b show male connectors 908, 910, 912, and 914 and female connectors 916, 918, 920 and 922 of the two rail segments 902 and 904. The connections of rail segments provide continuous continuity of the bus lines shown at 906.

Figure 10A:
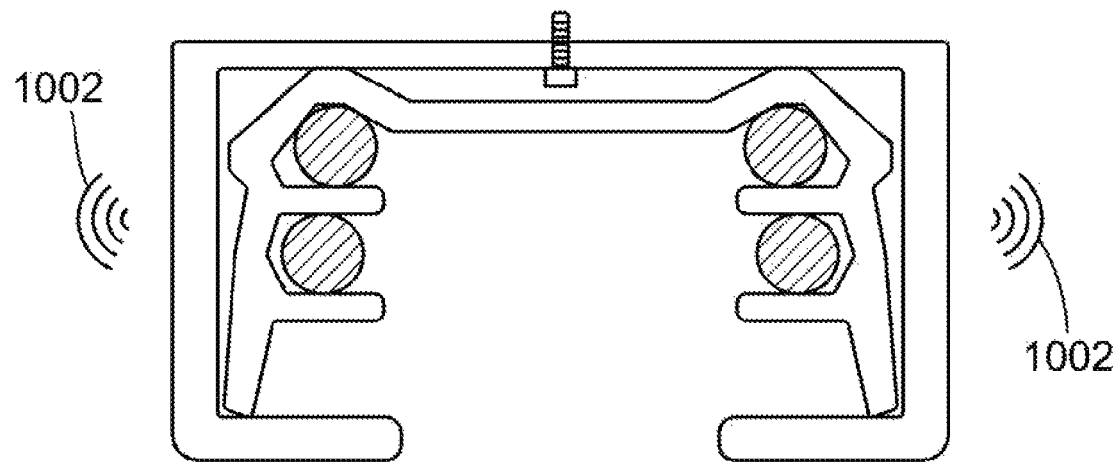
FIGS. 10a and 10b are cross-sectional views of a wireless track or rail in accordance with the invention.
Figure 10B:
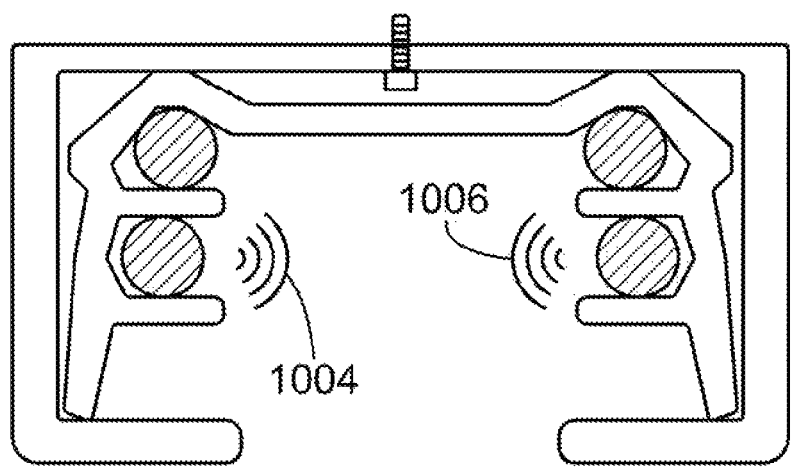

In FIGS. 10a and 10b, a rail is used as an antenna for transmitting and receiving radio waves 1002. A long rail may have advantages in receiving and transmitting electromagnetic waves especially between auxiliary devices on the rail. In FIG. 10b, wireless communication signals 1004 and 1006 are being transmitted from two different bus lines at the same time.

Figure 11:
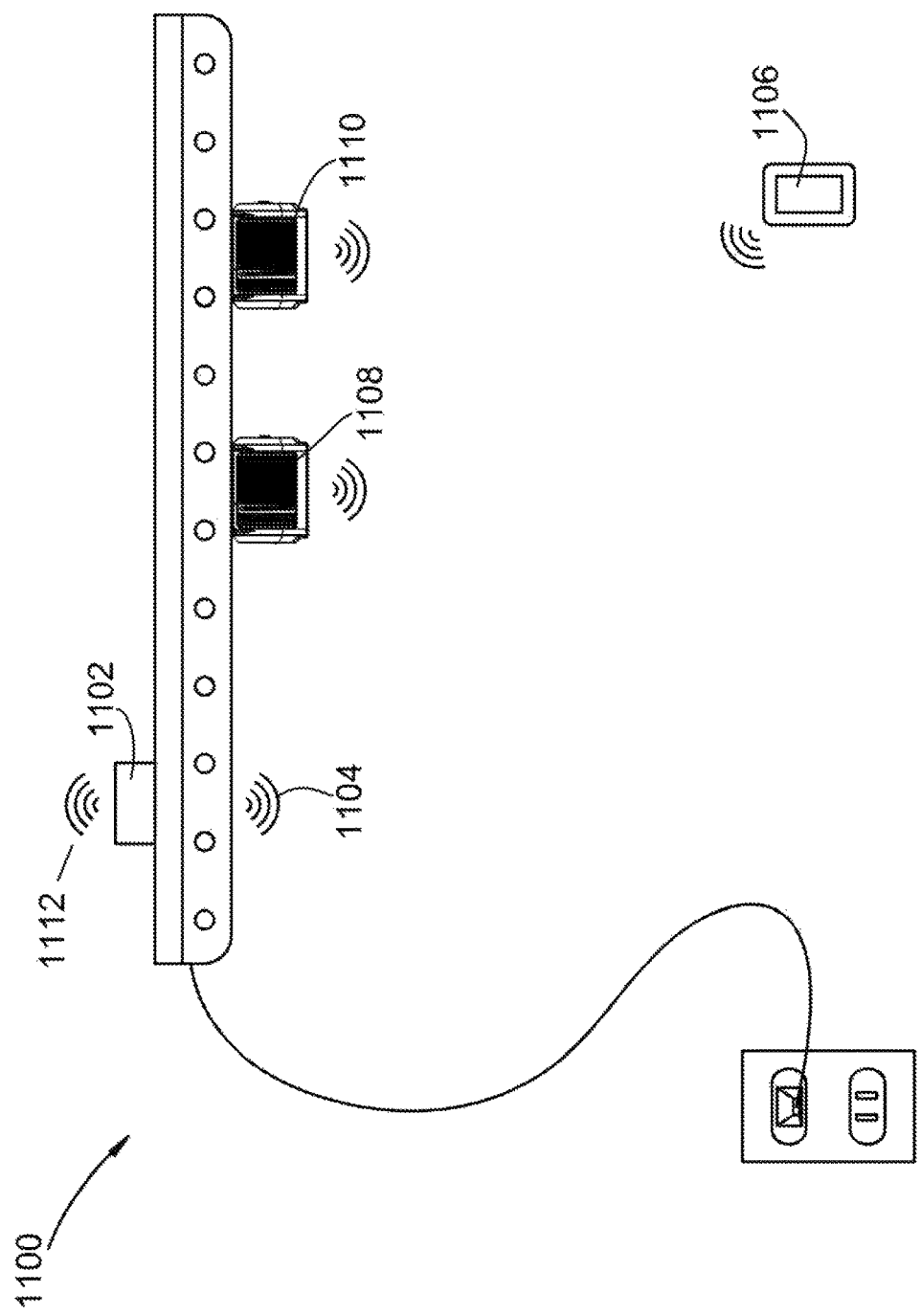
FIG. 11 is a front view of a wireless track or rail with attached auxiliary devices in accordance with the invention.

FIG. 11 shows an assembly 1100 comprising a built-in wireless transmitter 1102 built-in to the wireless rail. Here the wireless transmitter 1102 is transmitting a first signal 1112 from a circuit board within the transmitter 1102 using a printed circuit board (PCB) antenna and transmitting a second signal 1104 using the rail as a second antenna.

Figure 12:
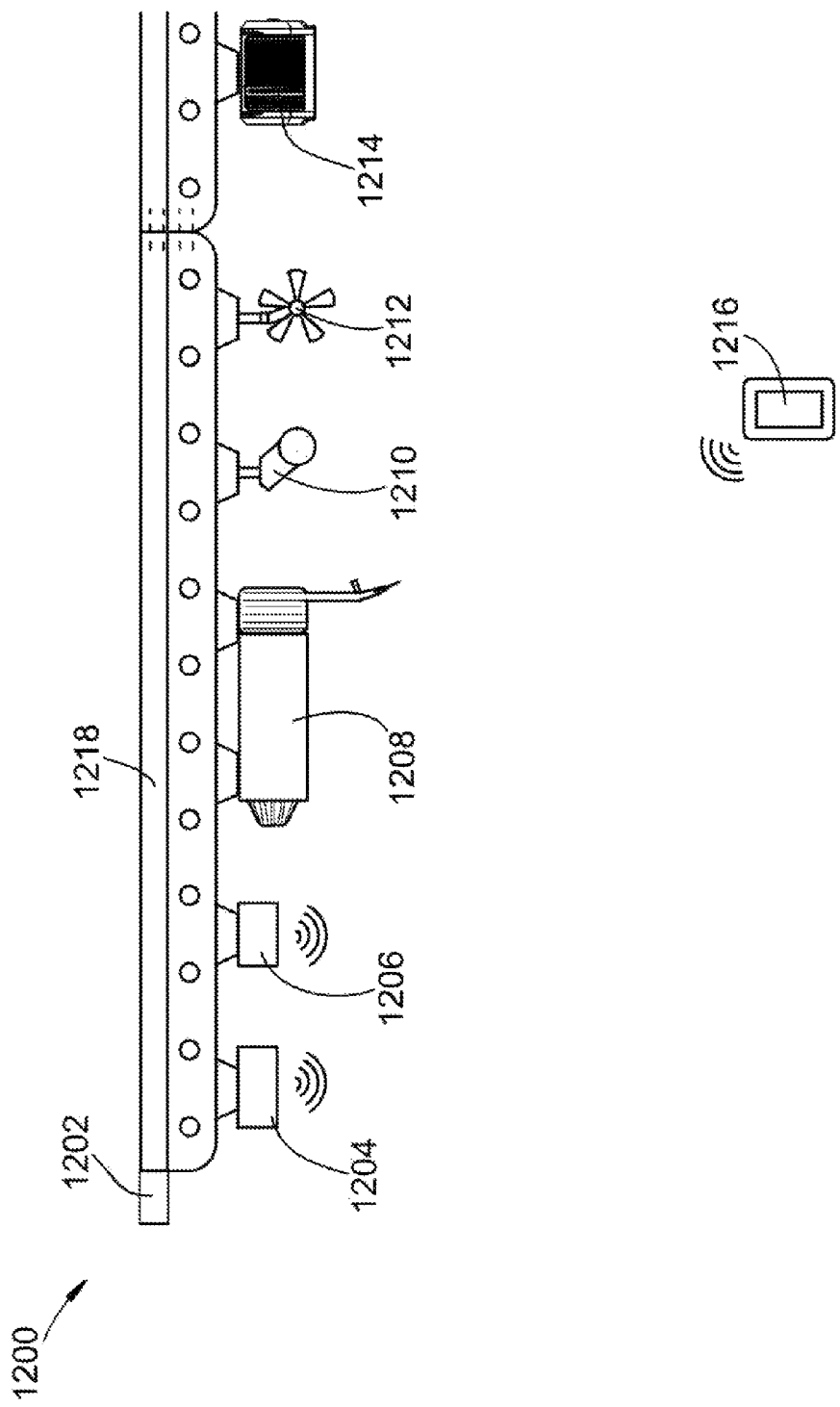
FIG. 12 is a front view of a wireless track or rail with attached auxiliary devices in accordance with the invention.

In FIG. 12, shows assembly 1200, an air compressor 1208 is mounted to the wireless rail 1218. The wireless rail 1218 is located in garage. Other auxiliary devices are also mounted to the rail and controlled by user device 1216. Power supply 1202 here is wired to line voltage within the garage. Controller 1204 has a short range wireless signal and controls and addresses devices on wireless rail 1216, such as fan 1212 and winch 1214, while controller 1206 is a long range wireless transceiver which communicates with cell towers miles away. Controller 1206 is also addressed by controller 1204 allowing a user device to remotely monitor an area by way of camera 1210.

Figure 13:
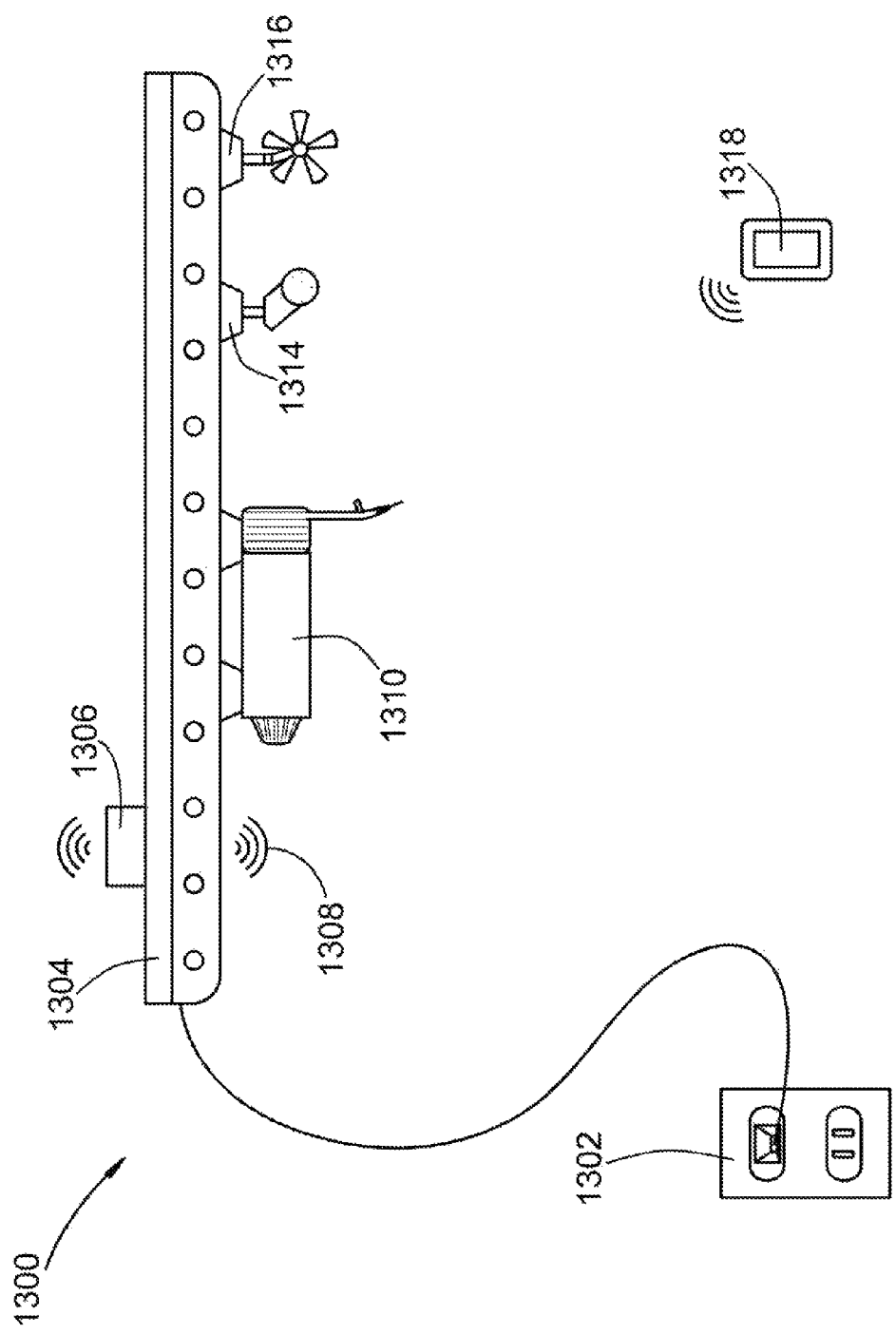
FIG. 13 is a front view of a wireless track or rail with attached auxiliary devices in accordance with the invention.

FIG. 13 shows an assembly 1300 comprising along range 1306 and short range 1308 wireless transceivers built into wireless rail 1304. Air compressor 1310, camera 1314, and fan 1316 are depicted mounted on the wireless rail 1304 and in communication with remote user device 1318. The power source for wireless rail 1304 is from outlet 1302.

Figure 14:
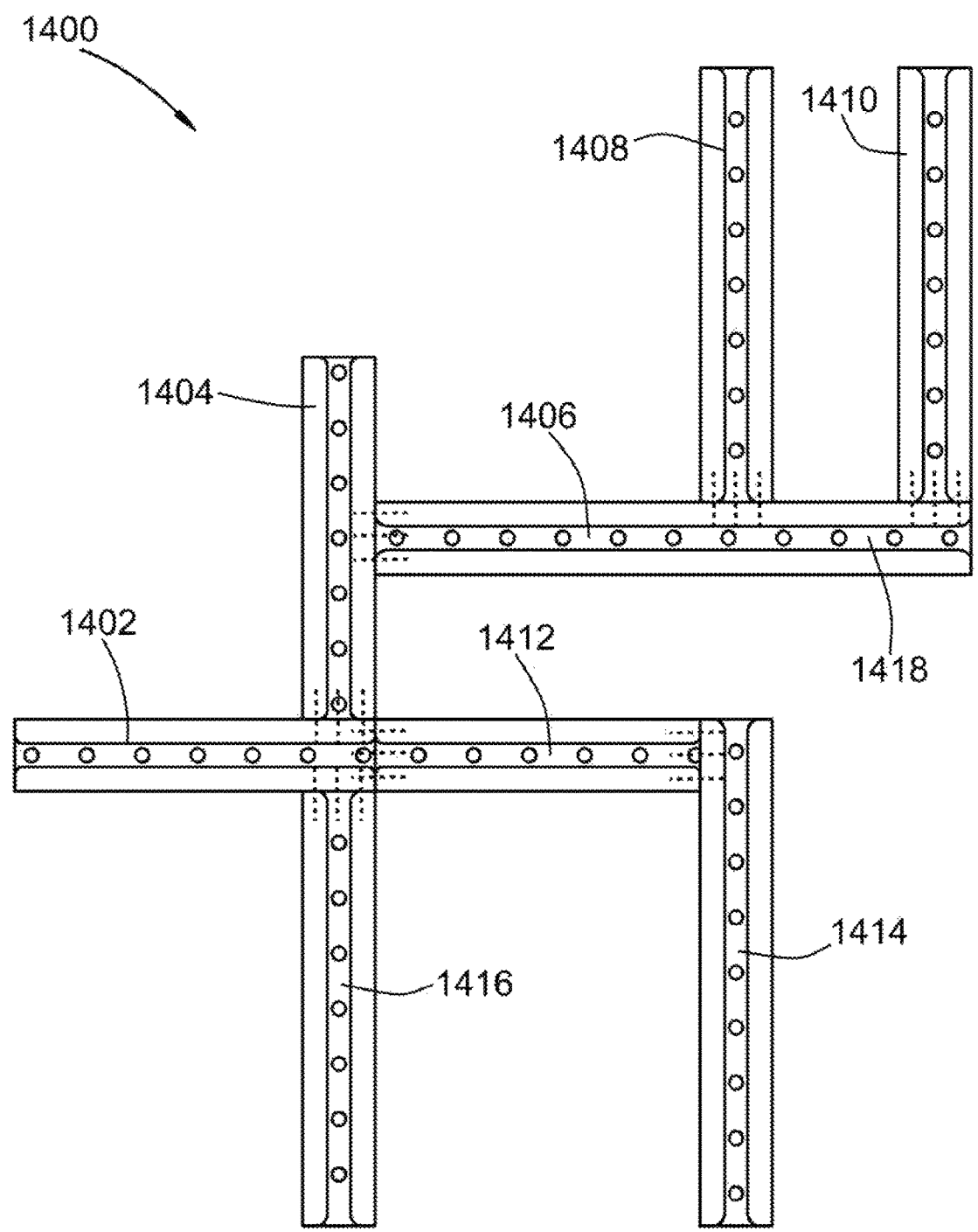
FIG. 14 is a bottom view of a wireless track or rail in accordance with the invention.

FIG. 14 shows an assembly 1400 comprising one or more channels 1402, 1404, 1406, 1408, 1410, 1412, 1414, 1416, and 1418 connected to form a rail 1400. This rail 1400 may be formed by mounting each channel to a stud, joist, ceiling or structural wall member.

Figure 15:
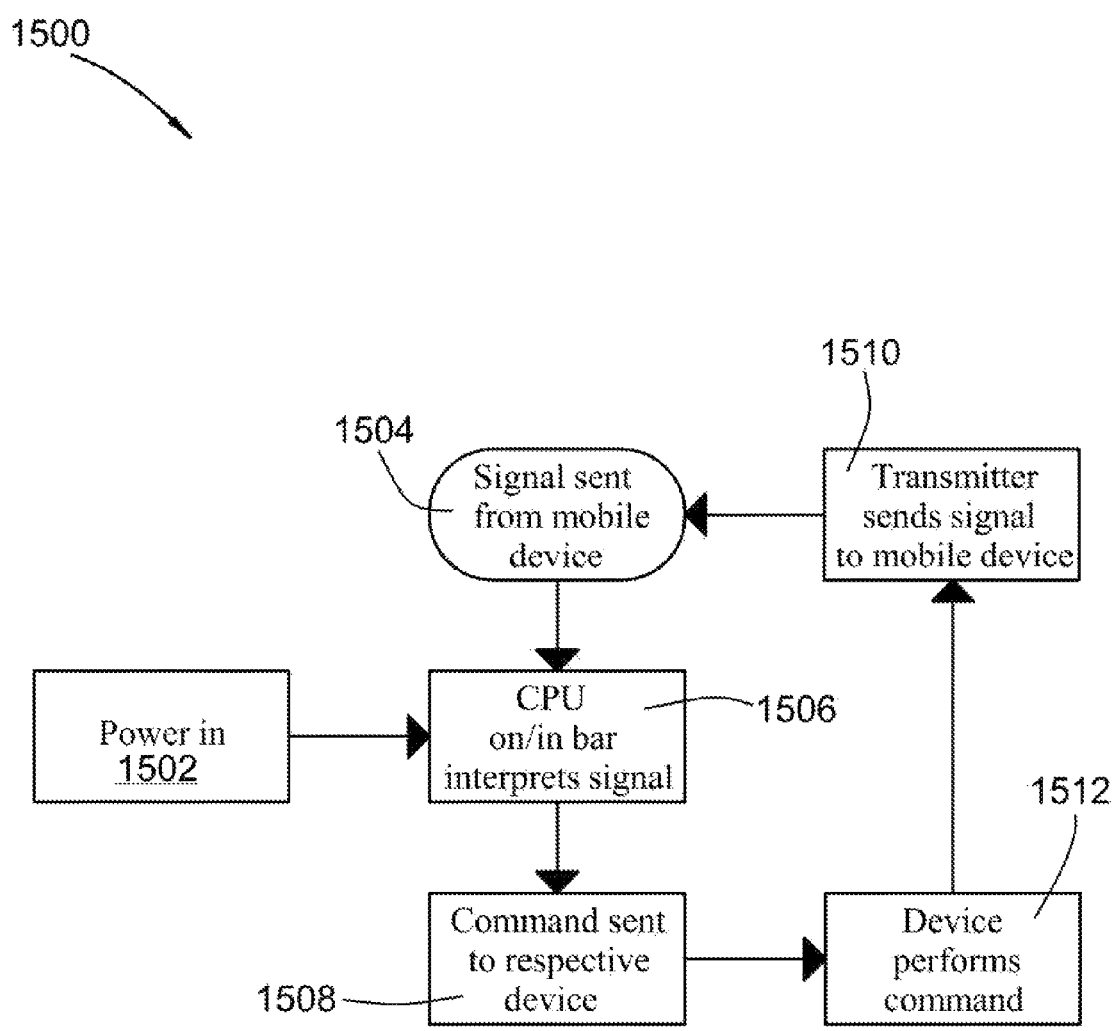
FIG. 15 is a flow chart of a wireless track or rail communication system in accordance with the invention.

FIG. 15 shows a block diagram 1500 for control of auxiliary devices on the wireless rail. At 1502 power is supplied to the rail. One or more controllers are powered at 1506. The one or more controllers look for a command to be sent to activate or enable a device on the wireless rail. A signal is sent from a user device at 1504. The signal is received and interpreted at 1506 by one or more devices on the wireless rail. A command is sent to a specific device on the wireless rail for performing a specific function at 1508. At 1512 the device on the wireless rail performs the function. The device sends a conformation of the performed function to the mobile device and/or one or more controllers.

Figure 16:
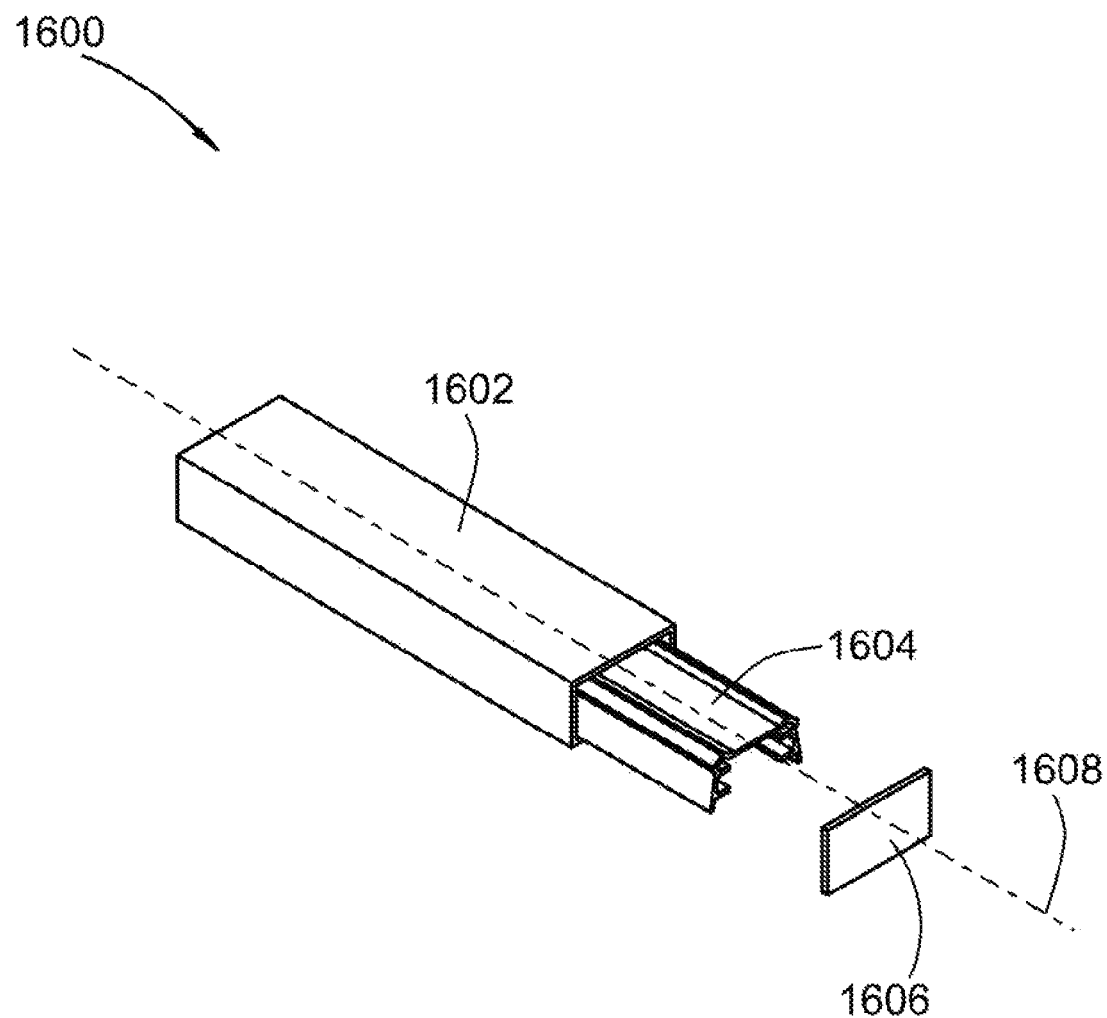
FIG. 16 is a top perspective view of a wireless track or rail in accordance with the invention.

FIG. 16 shows a perspective view 1600 of a wireless rail 1602 with an inner bracket 1604 and an end cap 1606. A mounting axis is depicted at 1608.

Figure 17:
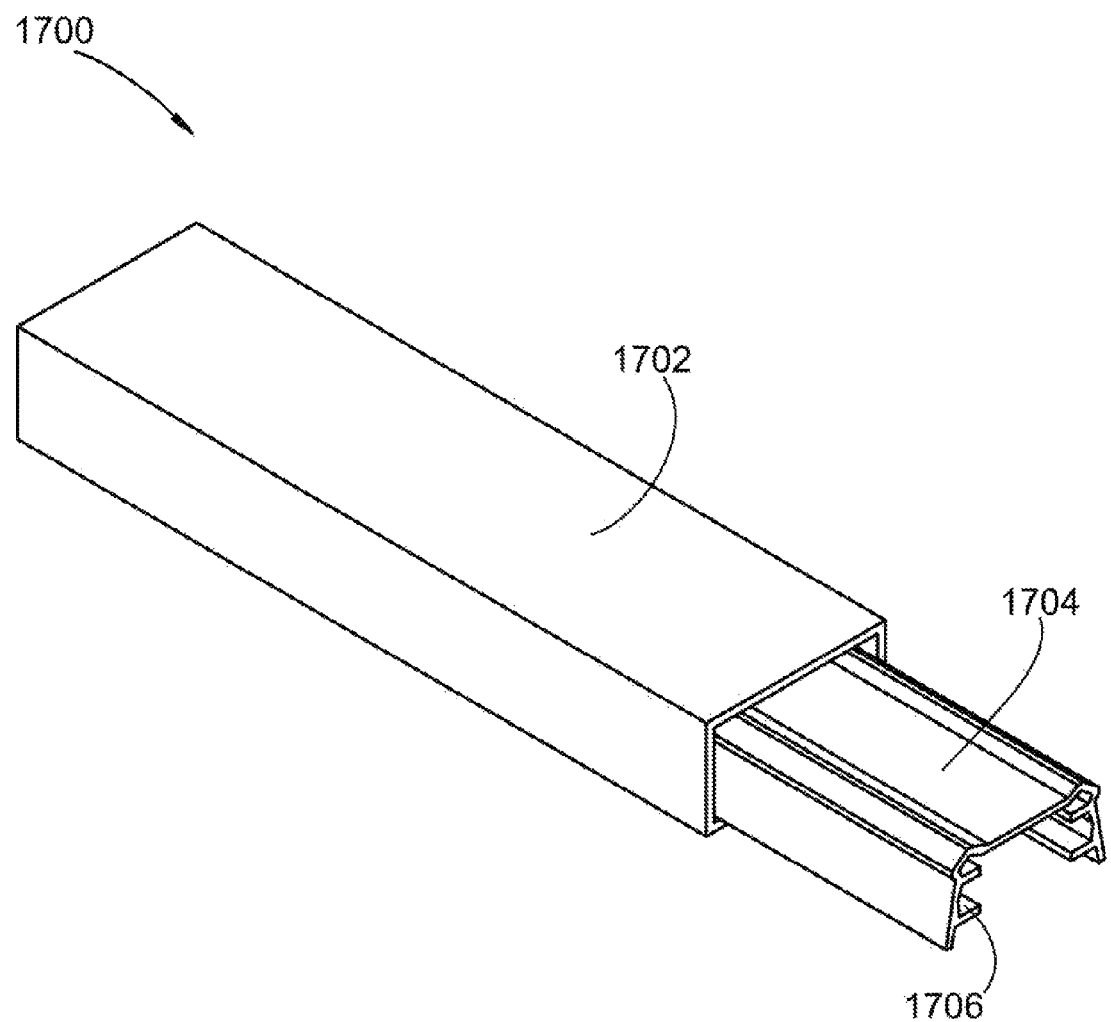
FIG. 17 is a top perspective view of a wireless track or rail in accordance with the invention.

FIG. 17 shows an assembly 1700 comprising an inner bracket comprising an area 1704 which is curved inward. This curved inward portion provides a space for a fastener to attach rail 1702 to a structural component. Grooves 1706 provide an area for retaining bus wires.

Figure 18A:
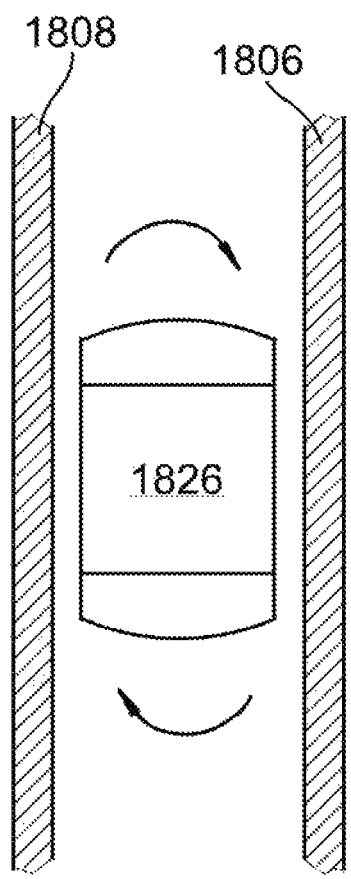
FIGS. 18a and 18b are 90 degree in-plane rotational views of a wireless track or rail in accordance with the invention.
Figure 18B:
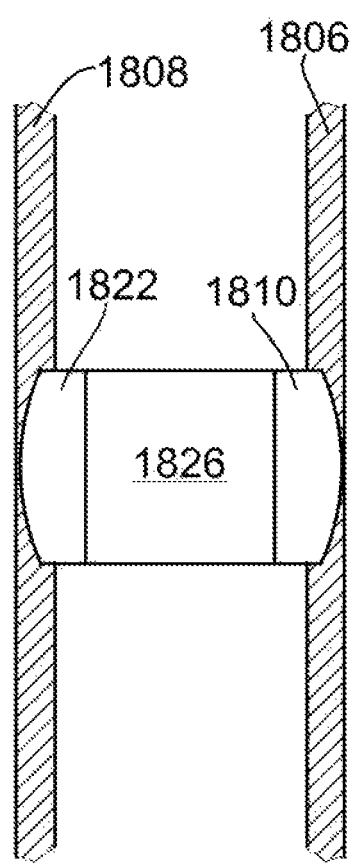

FIGS. 18a and 18b show 90 degree in-plane rotations of an auxiliary component 1826 within a rail. Wires 1806 and 1808 come into contact with end portions 1822 and 1810 when device 1826 is rotated and locked into the rail track.

Figure 19:
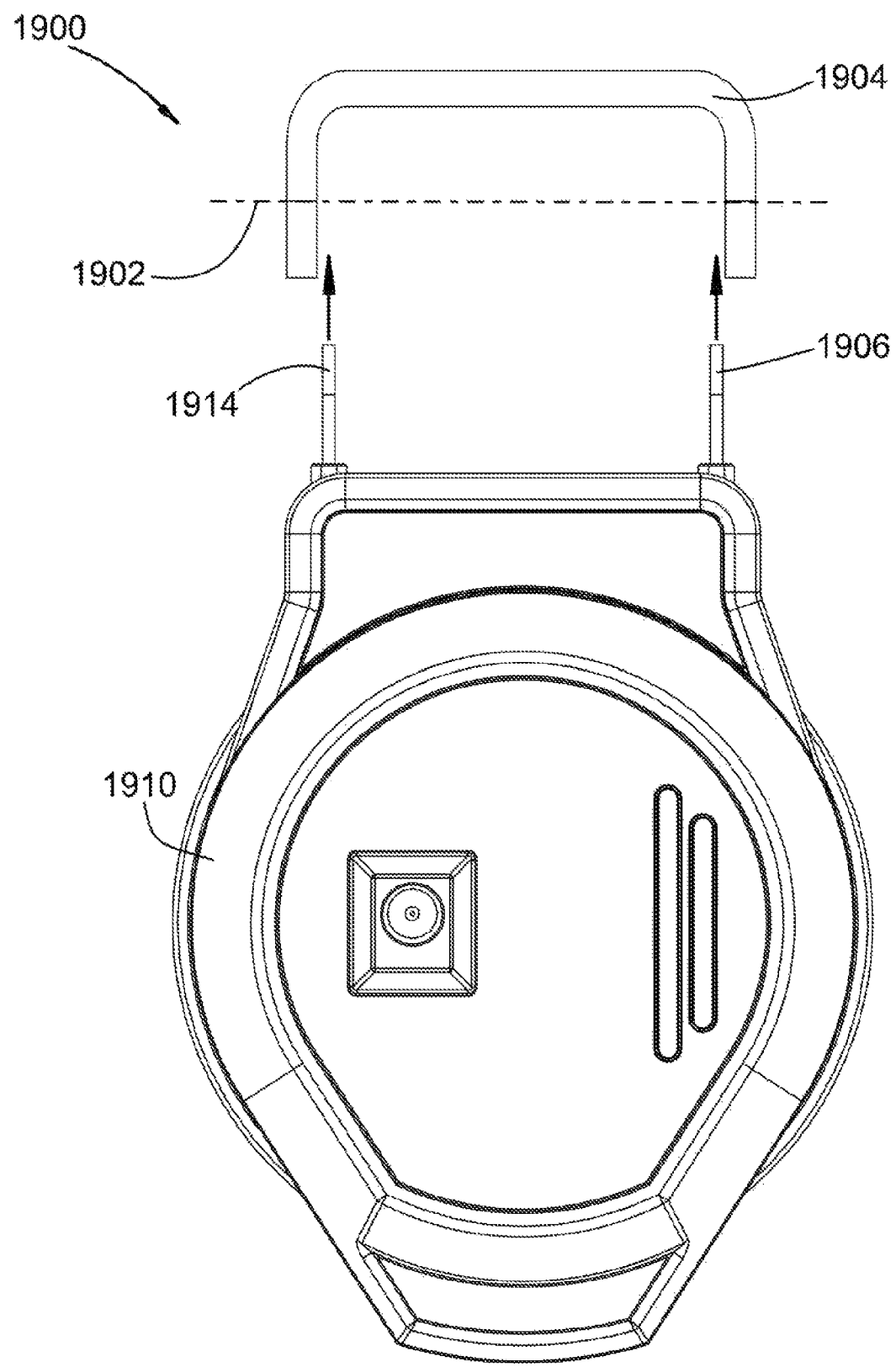
FIG. 19 is a view of various hardware components that may be used in a motorized lifting device in accordance with the invention.

FIG. 19 shows an assembly 1900 comprising a lifer device mounting bracket which may be used in connection with the wireless rail. Mounting bracket 1904 may be used around the rail with the rail mounted on an inside portion of the track and above lifter 1910. Lifting device 1910 includes a pair of flanges 1914 and 1906. The flanges 1914 and 1906 may enable the lifting device 1910 to be quickly and easily connected to a bracket 1904 with pins, bolts, or other fasteners at position 1902. Mounting bracket 1904 may be attached to a ceiling joist, wall stud, or other structural member. The flanges 1914 and 1906 may also allow the lifting device 1910 to be quickly and easily removed or attached to another bracket in a different location. Thus, the lifting device 1910 may be configured for quick and easy attachment and removal from ceilings, walls, or the like.

Figure 20:
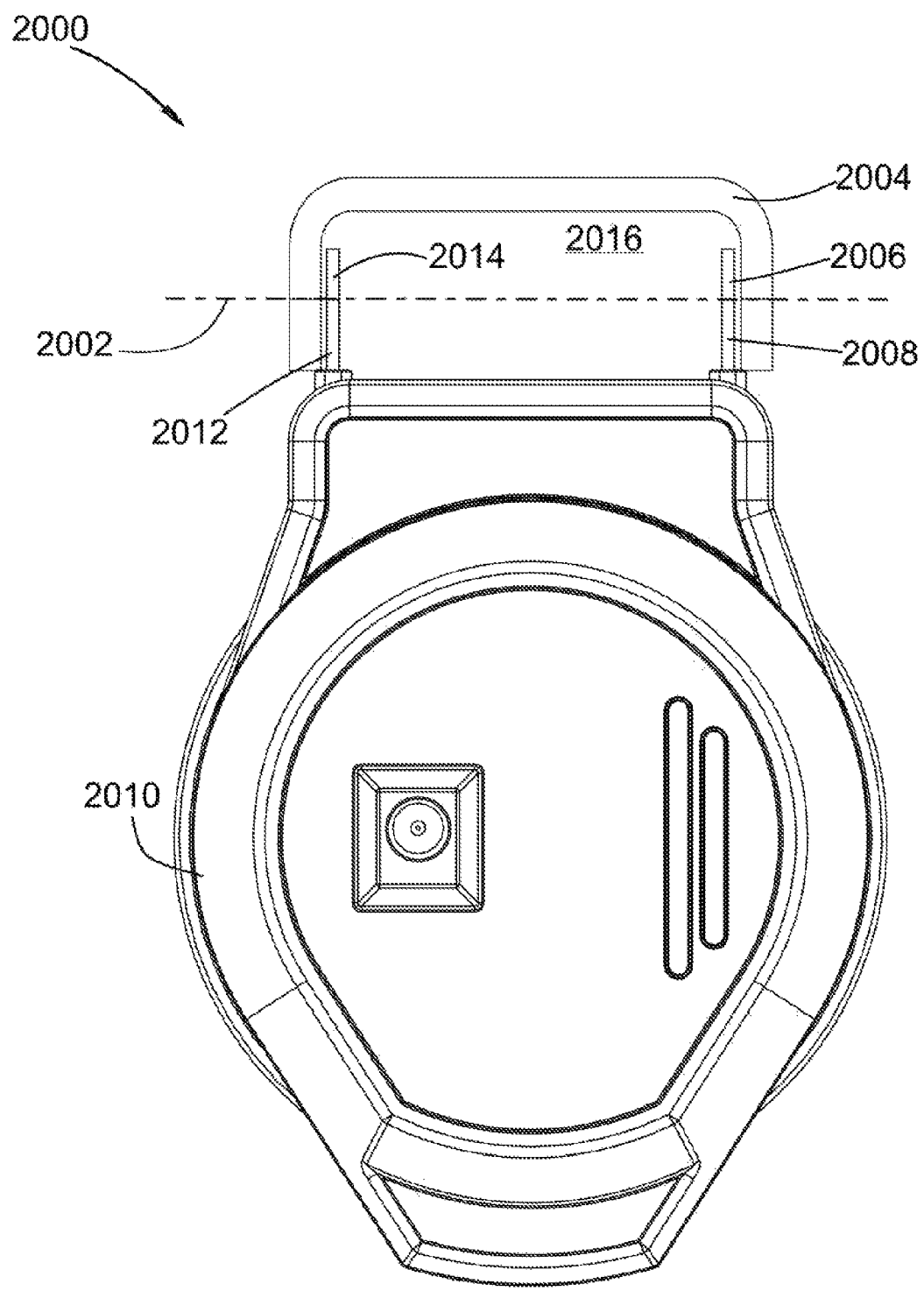
FIG. 20 is a view of various hardware components that may be used in a motorized lifting device in accordance with the invention.

FIG. 20 shows an assembly 2000 comprising a lifter device 2010 mounted within mounting bracket 2004. Areas 2012, 2014, 2006, and 2008 may serve to provide power to lifting device 2010 by way of a wireless rail which is located in area 2016.

The apparatus and methods disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A system comprising:
   one or more channels mounted to a stud, joist, ceiling or structural wall member forming a rail comprising two vertical side walls joined by horizontal wall, the respective vertical side walls comprising inwardly projecting mounting flanges forming a longitudinal opening between the respective mounting flanges;
   a removeable inner bracket mounted on an inner surface of the respective mounting flanges forming an internal busway comprising side walls joined by an inwardly projecting upper wall, the side walls comprising a plurality of opposed inwardly projecting compartments housing electrical conductor bus lines running parallel along the length thereof;
   the electrical conductors comprising an electrical contact surface;

a first power supply feeding the one or more of the electrical conductors within the removable inner bracket busway within the rail;

a controller and memory comprising one or more electrical contact surfaces removably attached to the removable inner bracket busway through the longitudinal opening within the rail, the one or more electrical contact surfaces being in contact with the electrical contact surface of the one or more electrical conductors;

a wireless communication module comprising an electrical contact surface removably attached to the removable inner bracket busway within the rail and in contact with the one or more electrical conductor bus lines; and two or more addressable lights comprising an electrical contact surface removably attached to the removable inner bracket busway through the longitudinal opening and removably in contact with the electrical contact surface of the electrical conductor bus lines within the respective compartments within the removable inner bracket busway within the rail.

2. The system of claim 1, wherein the controller, the memory and the two or more addressable lights are each attached or removed from the removable inner bracket busway within the rail by turning approximately 90 degrees.

3. The system of claim 1, wherein the wireless communication module is removably attached to the rail by turning approximately 90 degrees.

4. The system of claim 1, wherein the two or more addressable lights are each individually configurable by a user.

5. The system of claim 4, wherein the user is able to configure the memory according to a schedule for each of the two or more addressable lights.

6. The system of claim 1, further comprising a motion sensor.

7. The system of claim 6, wherein as the motion sensor tracks movement, the two or more lights respond to the movement.

8. The system of claim 1, further comprising an optical sensor.

9. The system of claim 8, wherein the two or more lights are controlled by the controller or the wireless communication module base on a signal from the optical sensor.

10. The system of claim 1, wherein the controller and/or the wireless communication module addresses the two or more lights over one or more parallel electrical conductor bus lines in the rail.

11. The system of claim 10, wherein the controller and/or the wireless communication module addresses the two or more lights by modulation of a power feed line of the parallel bus lines in the rail.

12. The system of claim 10, wherein the controller and/or the wireless communication module addresses the two or more lights by modulation of a ground line of the parallel bus lines in the rail.

13. The system of claim 10, wherein the controller and/or the wireless communication module addresses the two or more lights by modulation of a signal through a metal frame structure of the rail.

14. The system of claim 1, wherein the wireless communication module uses a structure of the rail as an antenna.

15. The system of claim 1, wherein the wireless communication module uses a bus line as an antenna for wireless communication with a user.

16. The system of claim 15, wherein the bus line antenna is also used for a ground, a power feed, or a data feed to the two or more lights.

17. The system of claim 1, wherein at least one of the two or more lights is used as a wireless relay or a wireless access point.

18. The system of claim 1, wherein the one or more channels are joined together to form a rail grid.

19. The system of claim 1, wherein the one or more channels are joined together end-to-end.

20. The system of claim 1, wherein the first power supply powers the rail with a line voltage.

* * * * *